E. W. KOPKE.
INSTRUMENT FOR COMPARING THE TURBIDITY OF LIQUIDS.
APPLICATION FILED SEPT. 2, 1911.
1,049,873.
Patented Jan. 7, 1913.
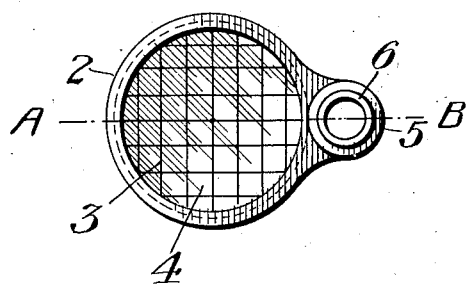
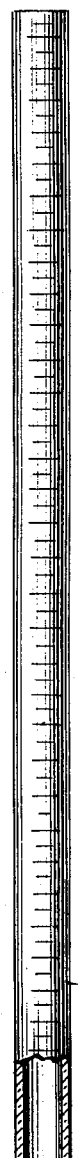
Fig. 1.
Fig. 2.
Witnesses:
Inventor:
Ernst Wilhelm Kopke,

UNITED STATES PATENT OFFICE.

ERNST WILHELM KOPKE, OF HONOLULU, TERRITORY OF HAWAII.

INSTRUMENT FOR COMPARING THE TURBIDITY OF LIQUIDS.

1,049,873.  Specification of Letters Patent.  Patented Jan. 7, 1913.

Application filed September 2, 1911.  Serial No. 647,419.

*To all whom it may concern:*

Be it known that I, ERNST WILHELM KOPKE, a citizen of the United States, residing at Honolulu, in the county of Honolulu and Territory of Hawaii, have invented certain new and useful Improvements in Instruments for Comparing the Turbidity of Liquids; and I do hereby declare the following to be a full, clear, and exact description of the invention, such as will enable others skilled in the art to which it appertains to make and use the same.

This invention relates to an instrument for comparing the turbidity of liquids; and the object of the invention is to produce an instrument of this character, which shall be simple, inexpensive and efficient.

My invention is based upon the fact that the turbidness of liquids is proportional to the amount of insoluble matter in suspension in the liquids, and that the transparency of said liquids is inversely proportional to their turbidity.

The invention contemplates a plate provided with markings thereon, means for lowering said plate in the liquid until the markings just become invisible to the eye of the observer, and means for determining the depth to which the plate was then submerged. The turbidity of various liquids may thus be compared, as the markings on the plate will become invisible at a greater or lesser depth in proportion as the turbidity is less or greater in the liquids compared.

In the accompanying drawings, forming a part of this specification, Figure 1 represents a plan view of a preferred form of my invention, and Fig. 2 is a sectional elevation of same on the line A—B of Fig. 1.

Referring to the drawings, the plate 1 of any suitable material is provided with a circular lip 2 for the reception of a card 3 and a glass cover 4. The card 3 is preferably white with black lines crossing same as shown. The joint between the periphery of the cover 4 and the lip 2 may be sealed with cement or in any other suitable manner, to prevent injury to the card 3 by contact with the liquids in which it may be submerged. The plate 1 is provided at one side with an extension or boss 5 having a hole in which is secured a tube 6 perpendicular to the plate 1. The tube 6 is preferably of glass and open at or near its ends, and may be detachable from the plate 1 for convenience in transportation. The tube 6 is graduated along its length, the graduations preferably reading from its upper end downward to the end secured to the boss 5 of the plate 1.

In operation, the instrument is held by the tube 6 perpendicularly, which serves as a handle, with the plate 1 downward and horizontal and submerged in the liquid to be tested. It will be observed that as the instrument is lowered in the liquid the markings or lines on the card 3 become less and less distinct, and that at a certain depth these lines just become invisible. When this depth is reached the opening at the upper end of the tube 6 is closed by placing a finger over same, and the instrument is then withdrawn from the liquid, the height of the column of liquid within the tube 6 being observed by reading the graduations. In a similar manner readings are obtained with other liquids and their turbidity is thus compared.

The invention is not limited to the specific structural details shown, for the reason that many obvious changes in the apparatus might be made without departing from the spirit of the invention.

I claim:

1. An instrument for measuring the turbidity of liquids, comprising a tube open at each end, and a plate provided with markings attached perpendicularly to said tube.

2. An instrument for comparing the turbidity of liquids, comprising, a plate provided with markings, a tube open at each end for lowering said plate in the liquid, and means for determining the amount said plate was submerged when its markings just became invisible to the eye of the observer.

3. An instrument for comparing the turbidity of liquids comprising, a plate provided with markings, a tube open at each end for submerging said plate in the liquid, and a scale attached to said tube.

4. An instrument for comparing the turbidity of liquids comprising, a plate provided with a card with markings, and a tube open at each end detachably secured to said plate and provided with graduations.

In testimony whereof I affix my signature, in presence of two witnesses.

ERNST WILHELM KOPKE.

Witnesses:
    THOS. P. W. GRAY,
    FRANK L. JAMES.